June 1, 1943. U. E. BOWES 2,320,341
METHOD OF FORMING INITIALLY LIQUID MATERIALS
Filed Sept. 21, 1940 2 Sheets-Sheet 1
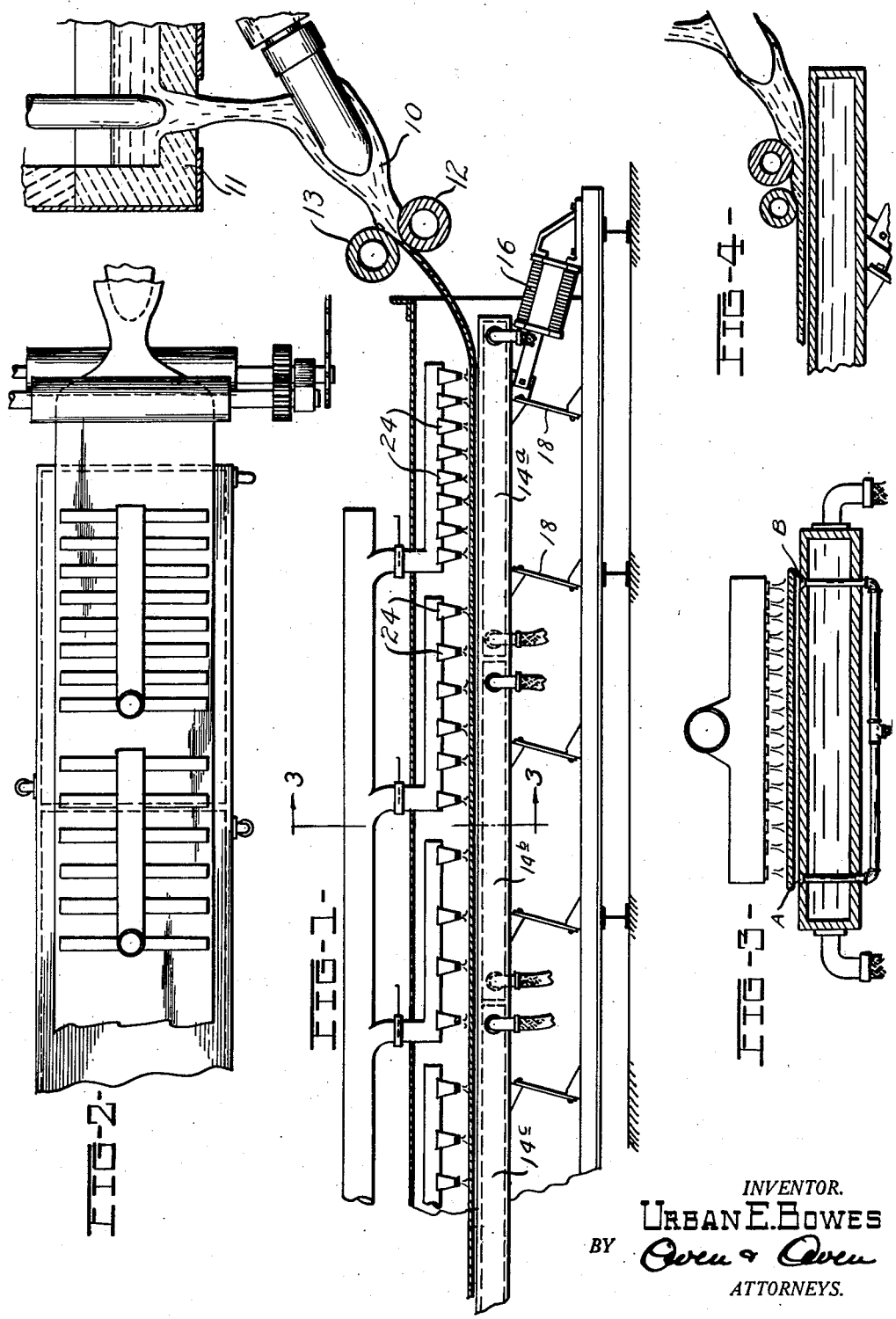
INVENTOR.
URBAN E. BOWES
BY
ATTORNEYS.

June 1, 1943.  U. E. BOWES  2,320,341
METHOD OF FORMING INITIALLY LIQUID MATERIALS
Filed Sept. 21, 1940  2 Sheets-Sheet 2
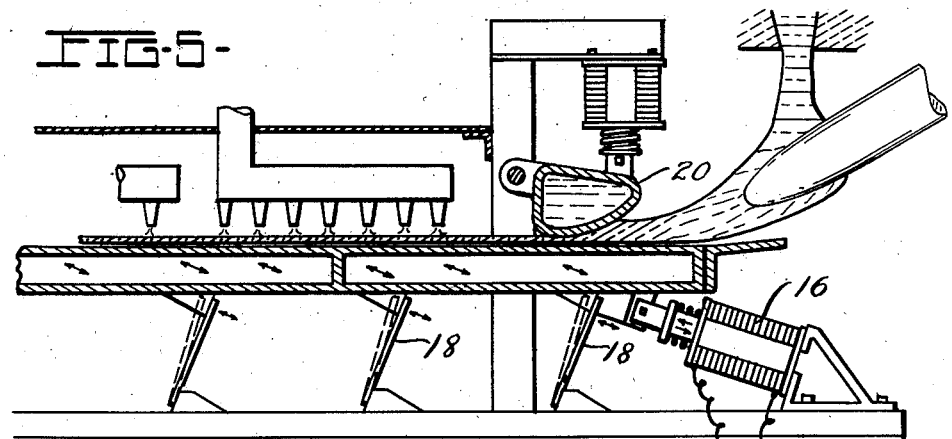
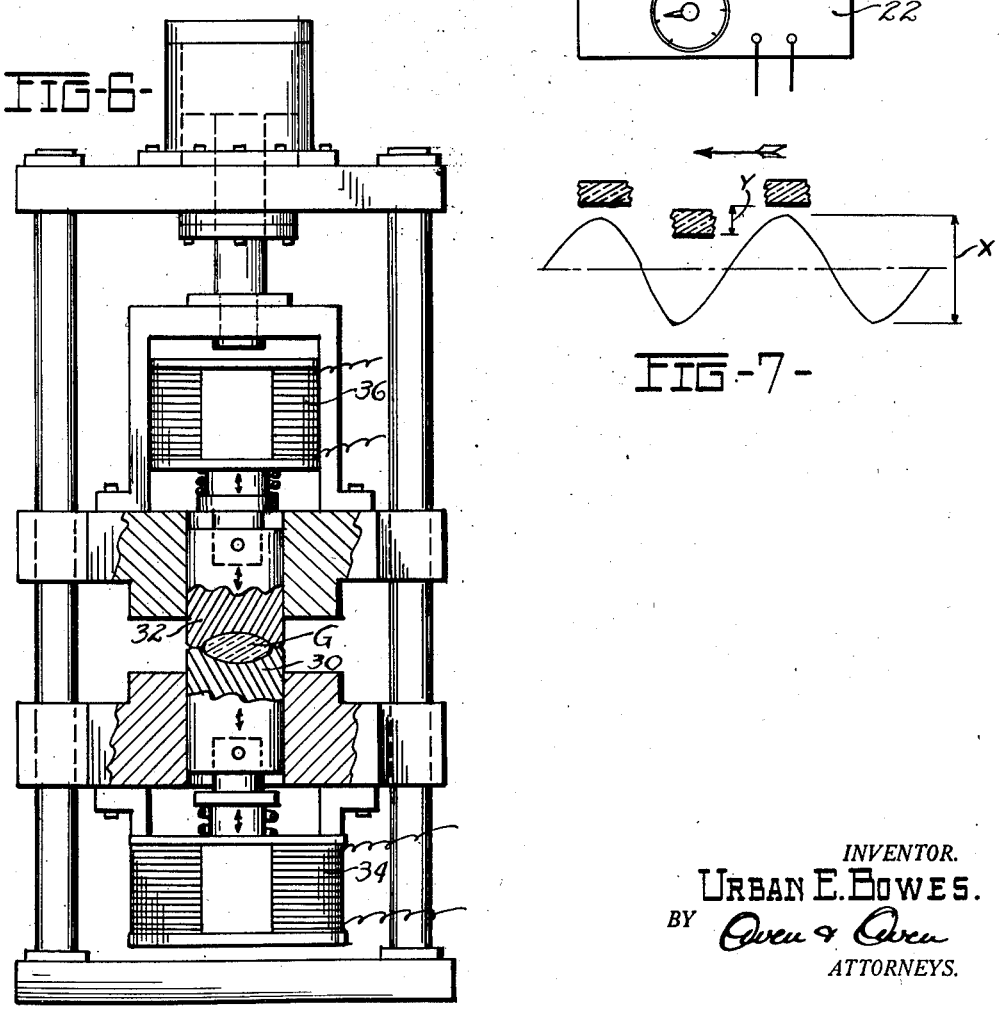
INVENTOR.
URBAN E. BOWES.
BY
ATTORNEYS.

Patented June 1, 1943

2,320,341

UNITED STATES PATENT OFFICE 2,320,341

METHOD OF FORMING INITIALLY LIQUID MATERIALS

Urban E. Bowes, Perrysburg, Ohio

Application September 21, 1940, Serial No. 357,779

6 Claims. (Cl. 49—85)

This invention relates to a method for shaping all or a portion of the surface of a mass of viscous material during the period when the viscosity of the material is increased to such a degree that the mass has lost the property of viscous flow. While the method is particularly applicable to forming sheets and articles of glass it is also useful in connection with other thermoplastic or metallic materials which, under suitable conditions of temperature, will possess the viscosity and surface tension relationships which make them susceptible to a similar treatment.

In the methods employed at present for making sheet glass by the so-called casting method, glass of a suitable chemical composition having been melted and refined is brought to a viscosity of approximately 1000 poises, which occurs with the usual compositions at approximately 2000° to 2200° F. The glass is poured on to a smooth metal plate ordinarily made of cast iron or other ferrous alloy, and a roller having a suitable clearance from the plate distributes the fluid mass and reduces it to the desired width and thickness.

Although the metal plate and roller used in this method can be ground and polished to a high degree of smoothness, this method does not produce glass with a surface sufficiently perfect for commercial use and a substantial amount of it is ordinarily ground from each surface until a smooth, optically satisfactory surface is secured.

One of the reasons why the present casting method does not produce a commercial article without the necessity of grinding and polishing is the limitation which exists inherently in the combination of temperatures of the metallic forming elements and the glass mass which can be used. If, for example, the glass is at a temperature of 2200° F., the surface of the metal must not rise above approximately 1200° F. (for a cast iron surface), or the glass will stick to the metal and cause surface tears and imperfections when it is removed. If the metal parts are too low in temperature the surface of the glass is chilled in such a way that surface cracks develop. There is, therefore, a comparatively narrow range in which the metallic parts must be kept if they are to remain in contact with the glass, and this range lies approximately 1000° or more below the temperature at which the glass has a sufficiently low viscosity to adapt itself to a shaping member.

It is obvious that the high rate of thermal conductivity of the metals ordinarily employed intensifies this problem by chilling the surface of the glass very quickly and extracting heat therefrom at a rate which causes a development of surface flaws by establishing an excessive temperature gradient in the sheet.

Inasmuch as the stress distribution in a sheet of glass is determined by the temperature gradient existing vertically through the sheet at the time the center becomes rigid, it is important for most purposes that the temperature difference between the surface and center be kept low. However, if the surface of the sheet is to be deliberately placed under compression a higher temperature difference may be established, in which case the gradient must be maintained substantially throughout the cooling period, or at the least until the entire body has lost the ability to flow of its own weight.

The primary object of the present invention is to provide a method of casting glass or similar materials which are fluid at elevated temperatures in such a manner as to produce a smooth surface which is relatively free of optical flaws.

Another object of the invention is the provision of a method for producing sheets of glass in which the glass is cooled at a controlled rate bearing a definite relationship to the temperature gradient vertically through the glass.

In order to illustrate the principles involved in the invention the method will be described in connection with the accompanying drawings, in which—

Figure 1 is a fragmentary side elevation of a machine suitable for carrying out the method; Fig. 2 is a fragmentary plan view thereof; Fig. 3 is a section on line 3—3 of Fig. 1; Fig. 4 is a fragmentary sectional view illustrating a modified form of shaping mechanism; Fig. 5 is a fragmentary view illustrating a further modification of shaping mechanism; Fig. 6 is an elevational view, with parts in section, of an apparatus for carrying out the method in connection with small shaped articles as distinguished from sheets, and Fig. 7 is a motion diagram.

The apparatus shown in the drawings discloses the invention in connection with the forming of flat glass, but it will be expressly understood that other materials possessing suitable characteristics of viscosity and surface tension may be employed. In the drawings, a stream or continuous mass of fluid glass 10 is separated from a supply body of glass maintained in a furnace 11 at suitable temperature and viscosity. The glass is given the desired width and thickness by any suitable means such as opposed rollers 12 and 13. Having been shaped, the glass is passed on to a smooth, polished metal table 14 which is preferably slightly wider than the glass sheet and which has its top surface ground to a high degree of flatness. The table 14 is preferably divided into longitudinal sections 14ª, 14ᵇ and 14ᶜ, each of which has a hollow interior as shown in Fig. 3 in order that a cooling medium may be passed therethrough. It will be appreciated that by dividing the table into sections in the direction of its length, the various parts of the table may be maintained at different temperatures.

While the common practice in the formation of sheet glass has been to maintain the table stationary, in the present method the table vibrates in a plane inclined from the vertical in the direction in which it is desired to move the sheet of glass as it is formed. The stroke of vibration need be only a few thousandths of an inch and may be accomplished by any suitable device, such as a solenoid 16, the armature of which is attached to the table and the table being supported on flexible members 18, so that as the armature reciprocates the table will move slightly about the point of support of the flexible members, as indicated in Fig. 5. The speed of vibration is such that the retraction of the table after it has moved forward is at a rate greater than the rate at which the sheet of glass will follow under the influence of gravity. The result is that the sheet is supported within a few thousandths of an inch of a given plane over a film of air which is alternately compressed and expanded within very narrow limits due to the short stroke of vibration of the table.

Since the table is out of contact with the glass, and is separated from it by a film of air of relatively substantial thickness a great portion of the time, the rate of heat flow from the hot glass to the table is materially retarded. Therefore, with glass of a given temperature, the plate will remain cooler than a similar plate in continuous contact with the glass. This permits a rigid metal plate to be used as a forming member to support a sheet of glass with its lower surface very accurately flat without the plate rising in temperature as in the present casting methods. In addition, the glass through not being chilled so rapidly, will remain for a longer time at the viscosity at which it can flow and adapt itself to the forces to which it is subjected in cooling. As previously noted, the rate of heat transfer to the table can be regulated to maintain any desired temperature differential between the glass and table surface.

In order to form the upper surface of the sheet, if desired to replace the rollers 12 and 13 shown in Figs. 1 and 2, other expedients can be resorted to, such, for example as the vibrating presser foot 20 shown in Fig. 5. Also diagrammatically illustrated in this figure is a frequency changing apparatus 22 by which the frequency of the vibration caused by the table solenoid 16 may be adjusted.

While the apparatus shown between the furnace and table includes a rotating glass receiving mandrel, it will be appreciated that any distributing mechanism such as an elongated plate beneath a slot in the furnace may be used, since such devices are well known in the art.

Also shown in the drawings is a cooling medium for the top of the material by which the temperature at this point is maintained substantially similar to the temperature of the bottom thereof. This cooling apparatus may include a plurality of air nozzles 24 so spaced as to give the desired volume of air per unit area of the plate. Obviously, any well known cooling expedient may be used in place of the jets shown.

The important principle of the invention is, of course, the movement of the glass plate lengthwise of the table by vibrating the table and, at the same time, maintaining the glass out of continuous contact with the table over at least that portion of the process in which the glass is solidifying.

It may be desirable in some instances to introduce a jet of air under the glass at the point where it first comes in contact with the table and, further, if the glass is kept from reaching the viscosity where it will no longer flow for a prolonged period, it may be desirable further to introduce slight amounts of air under it to compensate for the air pumped out by the vibrating table during the progress of the glass along it. This may readily be done by grooving the table as at A, B (Fig. 3), longitudinally along lines parallel to each edge of the material and spaced slightly inwardly thereof. Air introduced into the grooves A and B will expand in both directions and will establish a pressure curtain to retard the flow of air from under the material as it progresses along the table. (The width of the grooves is greatly exaggerated in the drawings.)

While the principal application of the method is the one previously described in forming sheets, the same principle may be applied for shaping solid masses of viscous plastic material having either flat or curved surfaces in which it is unnecessary to cause the mass to move horizontally. This may be accomplished by having the plane of vibration of the forming member entirely vertical. An example of this is shown in Fig. 6 in which is shown an apparatus suitable for forming lenses or the like. The apparatus consists simply of two mating dies 30 and 32, each of which is caused to vibrate by a respective solenoid 34, 36. The frequency of vibration caused by the solenoids is such that the gob of glass represented by G is caused to "float" between the dies and to be compressed largely by the compression of the air trapped therein.

The motion diagram shown in Fig. 7 illustrates the progress of a unit of glass moving in the direction of the arrow. The sine curve indicates the amplitude of movement in a vertical direction (greatly exaggerated, of course) of the surface of the table. It will be seen that at the peak of its movement the table is separated from the increment of glass by a very thin film of air and, as the table descends, it does so at a rate greater than the rate of descent of the glass under the influence of gravity. Thus, the glass falls only the distance represented by the arrow Y while the table descends a distance represented by the arrow X in Fig. 7. As the table again moves up, the air is recompressed under the glass so that the latter returns to its initial position. Lengthwise movement of the glass in the direction indicated is caused by inclining the plane of movement of the table to the vertical, a principle which has been well proved in practice.

While the invention has been particularly described in connection with the forming of glass, the method applies equally well to other thermoplastic materials and to such metals as do not "wet" the surface of the table. Operations on these materials are intended to be included in the scope of the appended claims.

What I claim as new and desire to secure by United States Letters Patent is:

1. The method of forming a body of thermoplastic, hardenable material which includes the steps of initially shaping the material, supporting the material over a body having its surface shaped to correspond with the desired surface of the finished material, vibrating said body in a path toward and from the material, and maintaining the rate of vibration such that the retraction of the body away from the material is in excess of the rate at which the material moves under the influence of gravity.

2. The method of forming a body of thermoplastic, hardenable material which includes the steps of initially shaping the material, supporting the material over a body having its surface shaped to correspond with the desired surface of the finished material, vibrating said body in a path having a vertical component, and maintaining the rate of vibration such that the lowering of the body away from the material is in excess of the rate at which the material falls under the influence of gravity.

3. The method of forming a body of thermoplastic, hardenable material which includes the steps of initially shaping the material, supporting the material over a body having its surface shaped to correspond with the desired surface of the finished material, vibrating said body in a path having both vertical and horizontal components whereby the material is moved horizontally over said body, and maintaining the rate of vibration such that the lowering of the body away from the material is in excess of the rate at which the material falls under the influence of gravity.

4. The method of forming a body of thermoplastic, hardenable material which includes the steps of initially shaping the material, supporting the material over a body having its surface shaped to correspond with the desired surface of the finished material, vibrating said body in a path having a vertical component while the material is plastic, maintaining the rate of vibration such that the lowering of the body away from the plastic material is in excess of the rate at which the material falls under the influence of gravity, and simultaneously establishing a temperature differential lengthwise of said body whereby the material is progressively cooled.

5. The method of forming a body of thermoplastic, hardenable material which includes the steps of initially shaping the material, supporting the material over a body having its surface shaped to correspond with the desired surface of the finished material, vibrating said body in a path having a vertical component while the material is plastic, maintaining the rate of vibration such that the lowering of the body away from the plastic material is in excess of the rate at which the material falls under the influence of gravity, establishing by cooling a temperature gradient vertically through the material, and maintaining said temperature gradient constant at least until the entire mass of material has lost the property of viscous flow.

6. The method of forming a body of thermoplastic, hardenable material which includes the steps of supporting the material over a body having its surface shaped to correspond with the desired surface of the finished material, vibrating said body in a path having a vertical component, maintaining the rate of vibration such that the lowering of the body away from the material is in excess of the rate at which the material falls under the influence of gravity and introducing a gas between the body and the material to compensate in part for air removed by the unequal displacement of the body and material during vibration.

URBAN E. BOWES.